(12) United States Patent
Jansen et al.

(10) Patent No.: US 9,181,129 B2
(45) Date of Patent: Nov. 10, 2015

(54) RESIN SUITABLE FOR CONSTRUCTION PURPOSES COMPRISING NORBORNENE FUNCTIONAL GROUPS AND THIOLS

(75) Inventors: Johan Franz Gradus Antonius Jansen, Geleen (NL); Michael Alphonsus Cornelis Johannes Van Dijck, Bree-Opitter (BE); Guido Joseph Elisabeth Hensen, Oirsbeek (NL)

(73) Assignee: DSM IP ASSETS B.V., Heerlen (NL)

(*) Notice: Subject to any disclaimer, the term of this patent is extended or adjusted under 35 U.S.C. 154(b) by 372 days.

(21) Appl. No.: 13/509,852

(22) PCT Filed: Nov. 29, 2010

(86) PCT No.: PCT/EP2010/068403
§ 371 (c)(1),
(2), (4) Date: Sep. 6, 2012

(87) PCT Pub. No.: WO2011/064360
PCT Pub. Date: Jun. 3, 2011

(65) Prior Publication Data
US 2012/0322928 A1    Dec. 20, 2012

(30) Foreign Application Priority Data

Nov. 30, 2009  (EP) .................................. 09177519

(51) Int. Cl.
| | | |
|---|---|---|
| C08K 5/37 | (2006.01) | |
| C08K 5/10 | (2006.01) | |
| C08L 67/06 | (2006.01) | |
| C08F 283/01 | (2006.01) | |
| C04B 26/06 | (2006.01) | |
| C08J 3/24 | (2006.01) | |
| C08L 33/10 | (2006.01) | |
| C04B 24/16 | (2006.01) | |
| C04B 26/18 | (2006.01) | |
| C08L 35/02 | (2006.01) | |
| C08L 51/08 | (2006.01) | |
| C08K 5/101 | (2006.01) | |
| C04B 40/06 | (2006.01) | |
| C08F 283/00 | (2006.01) | |
| C08G 18/67 | (2006.01) | |
| C08L 75/04 | (2006.01) | |
| C09J 175/16 | (2006.01) | |
| C08K 5/00 | (2006.01) | |
| C08K 5/12 | (2006.01) | |
| C08K 5/315 | (2006.01) | |
| C08K 5/372 | (2006.01) | |

(52) U.S. Cl.
CPC ................ *C04B 26/06* (2013.01); *C04B 24/16* (2013.01); *C04B 26/18* (2013.01); *C04B 40/065* (2013.01); *C08F 283/008* (2013.01); *C08F 283/01* (2013.01); *C08G 18/672* (2013.01); *C08J 3/24* (2013.01); *C08J 3/241* (2013.01); *C08K 5/101* (2013.01); *C08K 5/37* (2013.01); *C08L 33/10* (2013.01); *C08L 35/02* (2013.01); *C08L 51/08* (2013.01); *C08L 67/06* (2013.01); *C08L 75/04* (2013.01); *C09J 175/16* (2013.01); *C08K 5/0025* (2013.01); *C08K 5/10* (2013.01); *C08K 5/12* (2013.01); *C08K 5/315* (2013.01); *C08K 5/372* (2013.01)

(58) Field of Classification Search
CPC ........ C08K 5/37; C08K 5/372; C08K 5/0025; C08K 5/10; C08K 5/101; C04B 24/16; C04B 26/06; C04B 26/18; C04B 40/065; C08L 67/06; C08L 33/10; C08L 35/02; C08L 51/08; C08F 283/01; C08F 283/008; C08J 3/24; C08J 3/241
USPC .................................. 525/437, 439, 445, 447
See application file for complete search history.

(56) References Cited

U.S. PATENT DOCUMENTS

| | | | | |
|---|---|---|---|---|
| 5,320,886 A | * | 6/1994 | Bowen .......................... | 428/34.1 |
| 5,558,937 A | | 9/1996 | Woods et al. | |
| 5,936,005 A | * | 8/1999 | Askienazy et al. ............. | 522/120 |
| 2008/0275203 A1 | * | 11/2008 | Jansen et al. ................ | 526/318.6 |
| 2008/0300361 A1 | * | 12/2008 | Jansen et al. .................. | 524/609 |

FOREIGN PATENT DOCUMENTS

WO    WO 2007/042199    4/2007

OTHER PUBLICATIONS

International Search Report for PCT/EP2010/068403 mailed Jan. 26, 2011.
Written Opinion of the International Searching Authority mailed Jan. 26, 2011.
Cramer et al; Investigation of thiol-ene and thiol-ene-methacrylated based resins as dental restorative materials, *Dental Materials*, 26 (2010) 21-28.

* cited by examiner

*Primary Examiner* — Roberto Rabago
(74) *Attorney, Agent, or Firm* — Nixon & Vanderhye P.C.

(57) ABSTRACT

The present invention relates to a thermosetting resin composition suitable for construction purposes comprising (i) a thiol, (ii) a resin containing at least one norbornene group and having a molecular weight Mn of at least 500 Dalton, and (iii) a methacrylate containing compound whereby the resin composition comprises methacrylate containing compound in an amount of at least 5 wt % and at most 75 wt %, whereby 100 wt. % is the sum of methacrylate containing compound and resin containing at least one norbornene group. The present invention further relates to a two-component resin system consisting of component A and component B, wherein one of the components (A) comprises a resin containing at least one norbornene group and a methacrylate containing compound, whereby component (A) contains methacrylate containing compound in an amount of at least 5 wt % and at most 75 wt %, whereby 100 wt. % is the sum of methacrylate containing compound and resin containing at least one norbornene group; and the other component (B) comprises a thiol and a peroxide.

14 Claims, No Drawings

RESIN SUITABLE FOR CONSTRUCTION PURPOSES COMPRISING NORBORNENE FUNCTIONAL GROUPS AND THIOLS

This application is the U.S. national phase of International Application No. PCT/EP2010/068403 filed 29 Nov. 2010 which designated the U.S. and claims priority to EP 09177519.7 filed 30 Nov. 2009, the entire contents of each of which are hereby incorporated by reference.

The present invention relates to a thermosetting resin composition that is suitable for construction purposes. As used herein, suitable for construction purposes means that the resin composition upon radical curing results in structural objects. As meant herein, structural objects are considered to have a thickness of at least 0.5 mm and appropriate mechanical properties. The thermosetting resin composition according to the invention is further also suitable for adhesive purposes.

One of the more demanding structural applications is the chemical anchoring application, as in this application the mechanical strength of the cured resin, the adhesion of the cured resin to concrete and the adhesion of the cured resin to steel must be very good.

Chemical anchoring methods using resin compositions based on epoxy resins, which are cured with amines are known. Reference can, for instance, be made to EP1118628 and EP0974610. Such state of the art resin compositions exhibit, when cured, many desirable properties like low shrinkage etc., which makes them useful for oversized drillholes. Further epoxy resin-amine systems are used for adhesive purposes and the low shrinkage characteristic of these resin systems is hereby advantageous. However, these resin systems cure only very slowly at room temperature and do not cure at all at low temperatures, i.e. at temperatures lower than 0° C. A further disadvantage of these resin compositions is the fact that the amines employed are generally considered to be toxic and corrosive.

This problem of insufficiently quick curing at room temperature is overcome by using resin compositions in which the resin and reactive diluent are solely based on methacrylates. Reference can, for instance, be made to EP0713015 and EP0761792. According to EP0761792 gel times in the order of several minutes can be achieved at room temperature and thus fast curing can be obtained. However, these methacrylate based resin compositions exhibit, upon curing, substantial shrinkage. Shrinkage is disadvantageous for all structural applications, in particular for chemical anchoring applications. Shrinkage of an adhesive is of course also disadvantageous since shrinkage of the adhesive results in increased shrinkage stress and hence less adhesive strength.

WO2007/042199 describes a method for chemical anchoring using resin compositions comprising a thiol component, a non aromatic carbon double bond containing resin, such as a norbornene functional resin, and optionally a reactive diluent. These resin compositions advantageously result in faster (compared to epoxy-amine resin systems as referred to above) curing in particular at low temperatures and in lower shrinkage (compared to methacrylate resin systems as referred to above). Examples of suitable reactive diluents that may be used according to WO2007/042199 are, for instance, dicyclopentadiene (DCPD), norbornadiene, vinylnorbornene, epoxyethyl norbornene. Considering the experimentals, an allyl containing reactive diluent especially triallyl isocyanurate (TAIC) was used as reactive diluent.

A disadvantage of the reactive diluents described in WO2007/042199 is their relatively poor cutting power which means that for reducing the viscosity a relatively large amount of reactive diluent is required, which may result in reduced mechanical properties. However for many construction purposes the resins need to be filled and/or reinforced. These applications generally require low to very low viscosities of the resin in order to have a workable viscosity of the filled and/or reinforced resinous composition.

Another disadvantage is that changing the amount of reactive diluent only to a small extent has a large impact on the amount of thiol needed in order to get a certain level of mechanical properties of the cured resin composition, making the system less robust, i.e. highly sensitive to variation in reactive diluent content. The object of the present invention is to obtain a resin composition comprising a thiol and a resin containing reactive carbon-carbon double bonds that can have a low viscosity with limited amount of reactive diluent while being robust with respect to the amount of reactive diluent.

This object is surprisingly achieved by applying a resin composition comprising (i) a thiol, (ii) a resin containing at least one norbornene group and having a molecular weight Mn of at least 500 Dalton and (iii) a methacrylate containing compound as reactive diluent, whereby the resin composition comprises methacrylate containing compound in an amount of at least 5 wt % and at most 75 wt %, whereby 100 wt. % is the sum of methacrylate containing compound and resin containing at least one norbornene group.

It has surprisingly been found that with the resin composition according to the invention fast curing (as demonstrated by the gel time), low shrinkage upon curing and enhanced workability can be obtained. Enhanced workability means that the viscosity of the resin composition can be reduced by adding only limited amounts of methacrylate containing compound. Further, enhanced workability means that the amount of methacrylate containing compound can be increased (for example for decreasing the viscosity of the resin composition) without having to substantial increase the amount of thiol containing compound in order to get a certain level of mechanical properties of the cured resin composition. Thus, the resin composition according to the invention is very tolerant to the amount of methacryate containing compound (having the function of reactive diluent), which gives freedom to formulate, without having to compromise the mechanical properties.

One advantage of the resin compositions according to the invention is that they can be cured fast, as demonstrated by the gel time, both at low (even at temperatures lower than 0° C.) and high temperature (even at temperatures higher than 40° C. and even at temperatures higher than 50° C.).

Another advantage of the resin compositions according to the invention is that high curing velocities (as demonstrated by the difference between gel time and peak time) and still long enough gel times can be obtained, resulting in a higher flexibility in the work-flow. A certain gel time is required to ensure a sufficient working time for the user when applying said resin composition, for example to enable him to inserting and adjusting a fastening element after injection of the resin composition into a borehole.

WO-A-2005/100436 describes resin compositions that comprises a thiol component (XH component), a non aromatic carbon carbon double bond containing component (RU component) and in which at most 5 mol % of the reactive unsaturations are capable of undergoing homopolymerisation, i.e. at most 5 mol % (meth)acrylates. Thus, this publication teaches away from using (meth)acrylates.

An additional surprising advantage of the resin compositions according to the invention is that the shrinkage upon curing is low. This is very surprising since it is known that methacrylate based resin compositions exhibit, upon curing, substantial shrinkage, generally in the order of 15-20%.

End segments where the thermosetting resin compositions according to the present invention can be applied are chemical anchoring, but the resin compositions can also be advantageously used in for example adhesive applications, automotive parts, boats, roofing, construction, containers, relining, pipes, tanks, flooring, windmill blades. As meant herein, chemical anchoring refers to chemical fastening of anchoring elements such as tie bars, dowels, rock bolts, screws, anchor rods in for example bore holes, natural and artificial rocks.

Thermosetting resin compositions harden by chemical reaction, often generating heat when they are formed, and cannot be melted or readily re-formed once hardened.

The resin composition according to the invention comprises a resin containing at least one norbornene group. The norbornene group has preferably the following formula 1

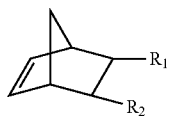

wherein $R_1$=C(O)O— (i.e. a carboxylic ester group) and $R_2$ is hydrogen, a carboxylic ester group, a nitrile group, or an alkyl group, an alkenyl group or an aryl group which can be substituted. Preferably $R_2$ is a methyl group or a carboxylic ester group. More preferably $R_2$ is a carboxylic ester group as this generally results in improved mechanical properties.

The norbornene group is attached or incorporated into the resin via at least the $R_1$ group. Preferably, the norbornene group is incorporated into the resin via the $R_1$ group and the $R_2$ group ($R_2$ then being a carboxylic ester group).

Preferably, the resin contains at least two reactive carbon-carbon unsaturations of which one reactive carbon-carbon unsaturation is in the norbornene group. More preferably the resin contains at least three reactive carbon-carbon unsaturations.

According to one embodiment, the resin contains at least 2 norbornene groups. More preferably, the resin contains at least 3 norbornene groups.

According to another embodiment, besides the norbornene groups, the resin may contain other reactive carbon-carbon double bonds such as non-aromatic carbon-carbon double bond moieties preferably selected from the group of allyl, vinyl, (meth)acrylic, fumaric, maleic, itaconic, crotonic, or cinnamic double bond moieties, or of Diels Alder adducts thereof. When containing other reactive carbon-carbon unsaturations than norbornene, preferred are methacrylic groups.

The resin containing norbornene groups has a molecular weight Mn of at least 500 Dalton, more preferably at least 750 Dalton and even more preferably at least 1000 Dalton. Preferably, the resin containing norbornene groups has a molecular weight of at most 10.000 Dalton, preferably at most 8000 Dalton, most preferably at most 6000 Dalton. The molecular weight (Mn) is determined in tetrahydrofurane using gel permeation chromatography according to ISO 13885-1 employing polystyrene standards and appropriate columns designed for the determination of the molecular weights. The resin containing norbornene groups preferably has a molecular weight Mn of at least 500 Dalton and at most 10.000 Dalton, more preferably at most 8000 Dalton and even more preferably at most 6000 Dalton. More preferably, the resin containing norbornene groups has a molecular weight Mn of at least 750 Dalton and at most 10.000 Dalton, more preferably at most 8000 Dalton and even more preferably at most 6000 Dalton. Even more preferably, the resin containing norbornene groups has a molecular weight Mn of at least 1000 Dalton and at most 10.000 Dalton, more preferably at most 8000 Dalton and even more preferably at most 6000 Dalton.

The resin containing at least one norbornene group can be prepared by methods known to a man ordinary skilled in the art. One possible way is to prepare an unsaturated polyester (as for example described in M. Malik et al. in J. M. S.—Rev. Macromol. Chem. Phys., C40(2&3), p.142-144 (2000)) and reacting this with cyclopentadiene under Diels-Alder conditions resulting in a resin containing at least norbornene group. Another possible way is to react cyclopentadiene under Diels-Alder conditions with (meth)acrylic acid or maleic anhydride and subsequently reacting this reaction product under polycondensation conditions with at least a polyol (such as diols and triols) and optionally a polycarboxylic acid (such as diacids and triacids and its anhydrides).

Many thiol-containing compounds can suitably be employed as thiol in the resin composition according to the invention. These compounds can be aromatic thiophenols, but also aliphatic thiols can be used. Preferably, the resin composition contains an aliphatic thiol.

Especially useful are the esters of α-mercapto acetic acid or β-mercapto propionic acid with a mono alcohol, diol, triol, tetraol, pentaol and/or other polyols. The ester can be part of a polymer. Also mixtures of alcohols can be used. Most preferably, the thiol is a α-mercapto acetate or β-mercapto propionate, or a derivative or mixture thereof.

Preferably, at least part of the thiols present in the resin composition has a thiol functionality of at least 2, more preferably at least 3. Thiol functionality is defined as the number of —SH per molecule of thiol group containing compound (also referred to as thiol in this application).

In a preferred embodiment, the resin composition comprises a mixture of thiols which mixture has an average thiol functionality of at least 1.5, preferably at least 2, more preferably at least 2.5.

In a preferred embodiment, at least a part of the thiol present in the resin composition is a thiol derived from a mercapto propionate or mercapto acetate Especially suitable thiols with a thiol-functionality equal to or higher than 3 are trimethylolpropane tris-mercapto acetate, trimethylolpropane tris-mercapto propionate, pentaerythritol tetra-mercapto acetate, pentaerythritol tetra-mercapto propionate, dipentaerythritol hexa-(3-mercaptopropionate), glycerol tris-(3-mercaptopropionates), dipentaerythritol hexa-mercapto acetate, trivinylcyclohexyl polymercaptan, trithiocyanuric acid, and their ethoxylated or propoxylated derivatives.

The resin composition according to the invention comprises a methacrylate containing compound as reactive diluent. The diluent, for instance, will be applied for adjustment of the viscosity of the resin composition in order to make handling thereof easier. As used herein, a reactive diluent is a diluent that is able to polymerize under the curing conditions.

In a preferred embodiment of the invention, at least a part of the methacrylate containing compound is at least difunctional in methacrylate, more preferably difunctional or trifunctional because the use of difunctional or trifunctional methacrylates may result in faster and more efficient curing. Preferably, the methacrylate containing compound or mixtures thereof has an average functionality of at least 1.5, more preferably of at least 2. Methacrylate functionality is defined as the number of methacrylate groups ($CH_2$=CMeCOO—) per molecule of methacrylate containing compound.

Examples of preferred methacrylate containing compounds applicable as reactive diluents are butanediol-1,4-dimethacrylate (BDDMA), triethyleneglycoldimethacrylate, glycerinedimethacrylate and trimethylolpropanetrimethacrylate (TMPTMA).

Preferably, the resin composition comprises at least 15 wt %, more preferably at least 25 wt % of methacrylate containing compound. Preferably, the resin composition comprises at most 65 wt %, more preferably at most 60 wt % of methacrylate containing compound, in which 100 wt % is the sum of the methacrylate containing compounds and the resins containing at least one norbornene group. As used herein, the amount of methacrylate containing compounds is relative to the total amount (in g) of the methacrylate containing compounds and the resins containing at least one norbornene group, thus neither the amount of thiol nor the amount of other compounds of the resin composition are taken into account for this calculation. In a preferred embodiment, the resin composition comprises methacrylate containing compound in an amount of at least 15 wt % and at most 65 wt %. In a more preferred embodiment, the resin composition comprises methacrylate containing compound in an amount of at least 25 wt % and at most 60 wt %.

The resin composition according to the invention preferably comprises thiol and norbornene containing resin in such amounts that the molar ratio of —SH to norbornene groups ranges from 10:1 to 1:10, preferably from 5:1 to 1:5, more preferably from 2:1 to 1:2, and most preferably is around 1:1.

The resin composition according to the invention preferably further comprises a transition metal containing compound, such as a transition metal salt. The presence of such transition metal compound is beneficial as it accelerates the curing of the resin composition with a peroxide. The transition metal is preferably selected from the transition metals with atomic numbers ranging from 22 to 29 or with an atomic number in the range from 38 to 49 or with an atomic number in the range from 57 to 79. More preferably, the transition metal is selected from V, Mn, Cu, Fe.

The resin composition according to the invention is curable with a radical initiator, preferably a peroxide. The peroxides used for the initiation of the curing reaction to obtain a structural part can be any peroxide known to the skilled man for being used in curing of unsaturated polyester resins and vinyl ester resins. Such peroxides include organic and inorganic peroxides, whether solid or liquid; also hydrogen peroxide may be applied. Examples of suitable peroxides are, for instance, peroxy carbonates (of the formula —OC(O)O—), peroxyesters (of the formula —C(O)OO—), diacylperoxides (of the formula —C(O)OOC(O)—), dialkylperoxides (of the formula —OO—), etc. They can also be oligomeric or polymeric in nature. An extensive series of examples of suitable peroxides can be found, for instance, in US 2002/0091214-A1, paragraph [0018]. The skilled man can easily obtain information about the peroxides and the precautions to be taken in handling the peroxides in the instructions as given by the peroxide producers.

Preferably, the peroxide is preferably a hydroperoxide, perether, perester, peranhydride or percarbonate, more preferably the peroxide is selected from the group of percarbonates, peresters and hydroperoxides and most preferably the peroxide is a monopercarbonate such as for instance Trigonox 117 or a perester such as for instance Trigonox C.

The storage stability of the resin compositions according to the invention is improved if, and this is preferred, the resin composition further comprises one or more inhibitors. Preferably at least one of the inhibitors is selected from phenolic compounds, N-oxyl compounds or nitroso compounds.

Suitable examples of inhibitors that can be used in the methods for chemical anchoring according to the invention are, for instance, 2-methoxyphenol, 4-methoxyphenol, 2,6-di-t-butyl-4-methylphenol, 2,6-di-t-butylphenol, 2,4,6-trimethyl-phenol, 2,4,6-tris-dimethylaminomethyl phenol, 4,4'-thio-bis(3-methyl-6-t-butylphenol), 4,4'-isopropylidene diphenol, 2,4-di-t-butylphenol, 6,6'-di-t-butyl-2,2'-methylene di-p-cresol, hydroquinone, 2-methylhydroquinone, 2-t-butylhydroquinone, 2,5-di-t-butylhydroquinone, 2,6-di-t-butylhydroquinone, 2,6-dimethylhydroquinone , 2,3,5-trimethylhydroquinone, catechol, 4-t-butylcatechol, 4,6-di-t-butylcatechol, benzoquinone, 2,3,5,6-tetrachloro-1,4-benzoquinone, methylbenzoquinone, 2,6-dimethylbenzoquinone, napthoquinone, 1-oxyl-2,2,6,6-tetramethylpiperidine, 1-oxyl-2,2,6,6-tetramethylpiperidine-4-ol (a compound also referred to as TEMPOL), 1-oxyl-2,2,6,6-tetramethylpiperidine-4-one (a compound also referred to as TEMPON), 1-oxyl-2,2,6,6-tetramethyl-4-carboxyl-piperidine (a compound also referred to as 4-carboxy-TEMPO), 1-oxyl-2,2,5,5-tetramethylpyrrolidine, 1-oxyl-2,2,5,5-tetramethyl-3-carboxylpyrrolidine (also called 3-carboxy-PROXYL), aluminium-N-nitrosophenyl hydroxylamine, diethylhydroxylamine, phenothiazine and/or derivatives or combinations of any of these compounds.

According to a preferred embodiment of the present invention the resin compositions are applied as a multi-component system, preferably as a 2-component system (A+B). The application of the two-component system requires mixing of the two components prior to its use.

The use of multi-component systems, in particular of 2-component systems, is nowadays well-known in for example chemical anchoring applications. However no resin systems are used therein as are now taught for such use in the present patent application.

The present invention therefore further relates to a two-component resin system consisting of component A and B, wherein one of the components (A) comprises the resin containing at least one norbornene group, the methacrylate containing compound and optionally a transition metal compound and the other component (B) comprises the thiol and optionally a peroxide. In a preferred embodiment, the other component (B) comprises the thiol and a peroxide. The compounds present in such two-component systems are described above. Also the preferred ones and the preferred amounts are described above. The amount of peroxide can be varied within wide ranges, in general less than 20 wt. %, and preferably less than 10 wt. % (wherein the amount of peroxide is relative to the total amount of thiol, resin containing the norbornene group and methacrylate containing compound).

In the resin composition according to the invention also fillers can be present. These fillers can be present in any of the components of a multi-component system. Therefore, according to another embodiment of the invention at least one of the components further comprises one or more fillers. A wide variety of fillers can be applied like for instance, without being limited thereto, silica, sand, cement, pigments etc. In the resin composition according to the invention also reinforcing fibers can be present, such as for example glass fibres, natural fibres and carbon fibres. Besides fibres and/or fillers, other additives may be present in the resin compositions according to the invention.

The present invention also relates to a process for radically curing the resin composition according to the invention by mixing the resin composition with a peroxide. The curing is preferably effected at a temperature in the range of from −20 to +200° C., preferably in the range of from −20 to +100° C., and most preferably in the range of from −10 to +60° C. (so-called cold curing).

The present invention further also relates to structural objects as are being obtained by mixing the resin composition according to the invention with a peroxide and curing at appropriate conditions or as being obtained by mixing the components of the multi-component resin system according to the invention and curing at appropriate conditions These structural objects have excellent mechanical properties. The present invention therefore also relates to the use of a multi component resin system according to the invention in adhesive applications, automotive parts, boats, roofing, construction, containers, relining, pipes, tanks, flooring, windmill blades or chemical anchoring.

The invention is now demonstrated by means of a series of examples and comparative examples. All examples are supportive of the scope of claims. The invention, however, is not restricted to the specific embodiments as shown in the examples.

EXPERIMENTAL SECTION

Monitoring of Curing

In most of the Examples and Comparative Examples presented hereinafter it is mentioned, that curing was monitored by means of standard gel time equipment. This is intended to mean that both the gel time ($T_{gel}$ or $T_{25 \to 35°C.}$) and peak time ($T_{peak}$ or $T_{25 \to peak}$) were determined by exotherm measurements according to the method of DIN 16945 when curing the resin with the peroxides as indicated in the Examples and Comparative Examples. The equipment used therefore was a Soform gel timer, with a Peakpro software package and National Instruments hardware; the waterbath and thermostat used were respectively Haake W26, and Haake DL30.

Synthesis of Resin A

A 2 l reactor equipped with a mechanical stirrer and a Dean Stark set-up was charged with 402 g trimethylolpropane, 147 g maleic anhydride and 1.1 g dibutylhydroquinone. After heating this mixture to 100 C during 2 h, 218 g toluene 10.9 g p-toluensulphonic acid and 541 g crotonic acid was added. The reaction mixture was heated to reflux and the water was removed azeotropic during 28 hr. Next 7.7 g trimethylolpropane oxetane (for neutralizing the remaining p-toluensulphonic acid) was added and the mixture was stirred at 100 C for an additional hour. Next the toluene and the excess crotonic acid were distilled off resulting in a yellowish resin. This resin was heated to 165 C and 550 g DCPD was added slowly during 8 hr whilst maintaining the reaction temperature between 165 and 180 C. After complete addition the reaction was kept at 170 C during 2 more hr before vacuum was applied (15 mBar) during 2 hr after which a norbonene functional resin with a Mn of approx 1000 Dalton was obtained.

Examples 1-2 and Comparative Experiments A-C

To 100 g of resin A was added x g (see Table 1) of reactive diluent and the mixture was stirred until the resin was completely dissolved in the reactive diluent. Next 200 ppm of Tempol and 1% VN-2 (a Vanadium based accelerator commercially available from Akzo-Nobel) was added followed by an y g (see Table 1; thiol) of penta erythritol tetra mercaptopropionate and 2% Trigonox C (% is based on the total sum) after which reactivity of the resin is measured followed by the Tg of the so obtained gel time rod after 24 hr.

The viscosity of the resin in reactive diluent was measured @ 25C using a Brookfield viscosimeter.

The reactivity was determined using the standard gel time equipment.

The Tg of the gel time rod was determined as onset using a Perkin Elmer DSC 7.

The results are shown in table 1.

TABLE 1

| | resin | Reactive Diluent RD(g) | Visco (Pa · s) | Thiol (g) | Geltime (min) | Peak time (min) | Peak temp (° C.) | Tg onset (° C.) |
|---|---|---|---|---|---|---|---|---|
| 1 | 100 | 33 BDDMA | 1 | 61 | 34 | 39 | 153 | 42 |
| 2 | 100 | 82 BDDMA | 0.09 | 61 | 33 | 39 | 172 | 40 |
| A | 100 | 33 TAIC | 8 | 61 | 28 | 32 | 145 | 39 |
| B | 100 | 82 TAIC | 2.5 | 61 | 34 | 37 | 113 | 1 |
| C | 100 | 82 TAIC | 2.5 | 82 | 74 | 80 | 163 | 42 |

The examples clearly demonstrate that methacrylate containing compounds are very good reactive diluents for the systems according to the invention.

Furthermore comparing the examples it is clear that the amount of thiol does not need adjustment in order to maintain mechanical properties (as illustrated by Tg onset) when the amount of methacrylate is altered. This is in sharp contrast to the allyl functional reactive diluent (triallyl isocyanurate TAIC), whereby lowering the viscosity by adding more reactive diluent (comp B vs comp A) results in very poor mechanics (comp B). More thiol is needed to compensate the mechanical properties (see comp C)

Furthermore in the resin compositions according to the invention, the amount of methacrylate has a minimal influence on the gel time making the system very robust whilst with the allyl reactive diluent the gel time is dramatically influenced when the amount of thiol is adjusted to obtain the best mechanical properties (comp A, B and C) as indicated by the Tg of the cured resins.

Furthermore, from the above mentioned gel times it is clear that there is more than sufficient working time with the resin systems according to the invention. As the peak times are close to the gel times this indicates that although long working times are obtained still a very fast and efficient cure process takes place.

Examples 3-6 and Comparative Experiments D-E

In order to demonstrate the versatility of the resins according to the invention the mechanical strength of the cured composition was assessed analogous to a pull out test from concrete as described in WO 2007 042199 using a 14 mm drill hole and an M12 anchor with a setting depth of 7 mm using a confined setting. By using this test method, a low value represents a low tensile strength of the cured resin, low adhesion of the cured resin to metal and/or to concrete. A low tensile strength represents insufficient cure.

In this test the unfilled resin formulations were used. The cited values are an average of 6 measurements.

To the resin prepared as described above, 100 ppm TEMPOL was added followed by adding the methacrylate reactive diluent. After stirring for 5 min the viscosity of this mixture was determined. Next the thiol was added followed by 1% of Nuodex Mn 10 (Mn based accelerator commercially available from Rockwood). After mixing 2% of Trigonox C was added and the 6 drillholes were filled and the anchor was set. After 24 hrs the anchors were pulled out of the concrete. The results are shown in Table 2 .

TABLE 2

| | Resin (g) | Thiol (g) | Reactive Diluent RD | Visco of resin in RD | Strength (kN) |
|---|---|---|---|---|---|
| 3 | 51 | 32 | 17 g BDDMA | 1 | 62 |
| 4 | 51 | 32 | 17 g TMPTMA | 3 | 75 |
| 5 | 51 | 32 | 41 g BDDMA | 0.2 | 72 |
| 6 | 51 | 32 | 41 g TMPTMA | 1 | 87 |
| D | 51 | 32 | 17 g TAIC | 6.5 | <10 |
| E | 51 | 49 | 17 g TAIC | 6.5 | 62 |

These examples and comparative experiments demonstrate clearly that the amount of methacrylate can be varied without the need to vary the amount of thiol without detrimentally affecting the mechanical properties (as determined in the pull out test) in contrast to allyl based reactive diluents which requires the adjustment of amount of thiol.

Furthermore these examples demonstrate that using methacrylates lower viscosities can be obtained. Also these examples show that various methacrylates can be used.

Moreover, comparing Ex 3 with Ex 5 shows the surprising fact that mechanical properties can even be further improved upon dilution with the methacrylate reactive diluents, while the amount of resin and thiol remains the same.

Examples 6A-G

Example 6 was repeated in a 2 component fashion using as A component 510 g of resin A, 410 g TMPTMA and 12.4 g Nuodex Mn 10. As B component a mixture of 320 g penta erythritol tetra mercaptopropionate and 25 g Trigonox C was prepared.

All 14 mm holes were filled by mixing 110 g of the A component with 40 g of the B component followed by setting the M12 anchor in the hole. For the 18 mm hole 165 g of the A component combined with 60 g of the B component was used. The anchors were pulled after 24 hrs. The pull out values (kN) are presented in Table 3

TABLE 3

| Example 6A | Ex 6B | Ex 6C | Ex 6D | Ex 6E | Ex 6F | Ex 6G |
|---|---|---|---|---|---|---|
| 14 mm RT (room temperature) | 18 mm RT | 14 mm Wet half cleaned | 14 mm −5° C. | 14 mm 40° C. | 14 mm Setting RT then 24 h 50° C., pulling 50° C. | 14 mm Setting RT then 24 h 80° C., pulling 80° C. |
| 75 | 80 | 51 | 60 | 87 | 75 | 53 |

These examples clearly demonstrate that the resin composition according to the invention can be used under various conditions, i.e. both at high as well as low temperatures and both under dry as well as wet conditions, Furthermore these examples demonstrate that the mixture according to the invention can be employed as a 2 component system. Moreover, as even at −5° C. a high pull out value after 24 hours is obtained, it is shown that the curing with the resin according to the invention is a fast process. Especially when compared to the epoxy amine systems generally used (which are not cured after 24 hrs at −5° C.).

Example 7 and Comparative Experiments F-G

Synthesis Methacrylate Resin

To a stirred reactor, charged with 575 g MDI (methylene diphenyl diisocyanate) and 0.3 g dibutyltin dilaurate, was added 71 g dipropyleneglycol at such a rate that the temperature did not exceed 60° C. After stirring for 30 min at 60° C., 792 g hydroxypropylmethacryalte HPMA was added and the temperature rose to 90° C. After stirring for 2 hr at 90° C. the mixture was cooled to room temperature and 767 g BDDMA were added.

4 mm castings were prepared according to the recipe of example 2 (Example 7) and of comparative experiment C (Comp Experiment F) as described in Table 1. For comparative experiment G, a 4 mm castings was prepared from the methacrylate resin described above containing 0.45% Tempol which was cured with 4% Lucidol CHSO and 1.7% diisopropyl para toluidine DIPT.

The shrinkage measurements were performed using a 50 ml picnometer for the determination of the densities before and after curing. The results are shown in table 4.

TABLE 4

| | Shrinkage % |
|---|---|
| Example 7 | 6 |
| Comparative F | 7 |
| Comparative G | 16 |

This example clearly demonstrates the low shrinkage of the resins according to the invention despite the fact that they are diluted with methacrylates which generally, as demonstrated with a methacrylate resin (comp Ex G), results in high shrinkage values.

Example 8

Synthesis of Resin B

A reactor was charged with 753.1 g Epon® 828 and heated to 100° C. at which temperature 1.5 g triphenylphosphine and 54.6 g fumaric acid was added. The reactor was heated to 140° C. and maintained at 140° C. until the acid value was below 0.1. Next the reactor was heated to 180° C. and 49.7 g dicyclopentadiene was slowly added. After complete addition of the DCPD, the reactor was stirred for another hour at 180° C. before cooling down to 110° C. At 110° C. 0.4 g Tempol was added followed by adding 242.6 g methacrylic acid in small portions. The reaction was continued until the acid value was below 25 after which the resin was cooled to below 80° C.

At this point the so obtained methacrylate functional norbornene containing resin, having a Mn of approx 1100 Dalton, was diluted with 300 g butanedioldimethacrylate and 600 g trimethylolpropane trimethacrylate and further stabilized with 0.246 g t-butylcatechol.

The diluted resin obtained in this way had a viscosity of 3644 mPas and an acid value of 10.5 mgKOH/g resin Pull Out Test To 100 g of the diluted resin B was added 1.5 g Octasoligen® Mn-10 (10% Manganese) and stirred for 5 min. Next a mixture of 7 g pentaerythritol tetrakis mercaptopropionate and 2 g t-butylperbenzoate were added. A reference drill hole was filed with this mixtue and a steel rod set. After 24 hrs a load value of 101 kN was obtained in the pull out test.

Besides very good mechanical properties this value also indicates a good adhesive power to concrete and steel.

Adhesion Test

To 100 g of the diluted resin B was added 1.5 g Octasoligen® Mn-10 (10% Mn) and stirred for 5 min. Next a mixture of 7 g pentaerythritol tetrakis mercaptopropionate and 2 g t-butylperbenzoate were added.

Within 5 min several small bars of different materials were glued together with this mixture. After 24 hrs a manual attempt was made to separate the bars.

Using wood on metal, wood on wood, glass on metal, glass on plastic, glass on glass and metal on metal, the bars could not be separated indicating the fact that these resin mixtures are suitable for adhesive purposes.

The invention claimed is:

1. A resin composition comprising:
   (i) a thiol selected from the group consisting of a mercapto propionate and a mercapto acetate,
   (ii) a resin containing at least one norbornene group and having a molecular weight Mn of at least 500 Dalton, and
   (iii) at least 15 wt. % to at most 65 wt. % of a methacrylate containing compound, wherein the methacrylate containing compound is difunctional or trifunctional in methacrylate, and wherein 100 wt. % is a sum of the methacrylate containing compound and the resin containing at least one norbornene group.

2. The resin composition according to claim 1, which comprises at least 25 wt % of the methacrylate containing compound.

3. The resin composition according to claim 1, which comprises at most 60 wt % of the methacrylate containing compound.

4. The resin composition according to claim 1, wherein the norbornene group has the following formula 1

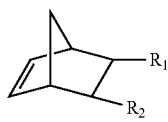

wherein R1 is a carboxylic ester group and R2 is hydrogen, a carboxylic ester group, a nitrile group, an alkyl group, an alkenyl group or an aryl group.

5. The resin composition according to claim 1, wherein the composition has a molar ratio of —SH to norbornene groups which ranges from 10:1 to 1:10.

6. The resin composition according to claim 1, which further comprises a transition metal compound.

7. A two-component resin system consisting of component (A) and component (B), wherein
   the component (A) comprises a resin containing at least one norbornene group and at least 15 wt % to at most 65 wt % of a methacrylate containing compound, wherein the methacrylate containing compound is difunctional or trifunctional in methacrylate, and wherein 100 wt. % is a sum of the methacrylate containing compound and the resin containing at least one norbornene group; and wherein
   the component (B) comprises a thiol and a peroxide, wherein the thiol is selected from the group consisting of a mercapto propionate and a mercapto acetate.

8. The two component resin system according to claim 7, wherein a molar ratio of —SH present in the component (B) to the norbornene groups present in the component (A) ranges from 10:1 to 1:10.

9. The two component resin system according to claim 7, wherein at least one of the components (A) and (B) further comprises an inhibitor.

10. A process for radically curing a resin composition, wherein the process comprises mixing components (A) and (B) of the two-component resin system according to claim 7.

11. A cured structural object obtained by mixing a resin composition according to claim 1 with peroxide.

12. A process for radically curing a resin composition, wherein the process comprises mixing a resin composition according to claim 1 with a peroxide.

13. A cured structural object obtained by mixing the components of the two component resin system according to claim 7.

14. The cured structural object of claim 13, wherein the object is selected from the group consisting of automotive parts, boat parts, roofing, construction objects, containers, relining, pipes, tanks, flooring, windmill blades and chemical anchors.

* * * * *